United States Patent [19]
Robinson

[11] Patent Number: 5,718,481
[45] Date of Patent: Feb. 17, 1998

[54] SEAT RECLINER MECHANISM

[75] Inventor: David Lee Robinson, Sterling Heights, Mich.

[73] Assignee: Fisher Dynamics Corporation, St. Clair Shores, Mich.

[21] Appl. No.: 411,970

[22] Filed: Mar. 28, 1995

[51] Int. Cl.⁶ .................................................. B60N 2/02
[52] U.S. Cl. ..................................... 297/367; 297/378.14
[58] Field of Search ..................... 297/378.14, 378.12, 297/378.1, 367, 366

[56] References Cited

U.S. PATENT DOCUMENTS

| | | |
|---|---|---|
| 4,219,234 | 8/1980 | Bell . |
| 4,243,264 | 1/1981 | Bell . |
| 4,279,442 | 7/1981 | Bell . |
| 4,357,050 | 11/1982 | Fisher, III . |
| 4,372,610 | 2/1983 | Fisher, III et al. . |
| 4,457,557 | 7/1984 | Une ........................ 297/378.12 X |
| 4,579,387 | 4/1986 | Bell . |
| 4,629,252 | 12/1986 | Myers et al. ............... 297/378.12 X |
| 4,634,182 | 1/1987 | Tanaka . |
| 4,641,884 | 2/1987 | Miyashita et al. . |
| 4,705,319 | 11/1987 | Bell . |
| 4,747,641 | 5/1988 | Bell . |
| 4,765,680 | 8/1988 | Kawashima . |
| 4,767,158 | 8/1988 | Staoh . |
| 4,770,463 | 9/1988 | Nishino . |
| 4,775,186 | 10/1988 | Nishino . |
| 4,781,415 | 11/1988 | Heesch et al. . |
| 4,795,213 | 1/1989 | Bell . |
| 4,801,177 | 1/1989 | Kanazawa . |
| 4,822,100 | 4/1989 | Bell . |
| 4,836,608 | 6/1989 | Sugiyama .................... 297/378.12 X |
| 4,875,735 | 10/1989 | Moyer et al. . |
| 4,978,170 | 12/1990 | Pelz et al. . |
| 5,028,091 | 7/1991 | Zaveri . |
| 5,154,476 | 10/1992 | Haider et al. . |
| 5,249,840 | 10/1993 | Hoshihara et al. . |

FOREIGN PATENT DOCUMENTS

8605958  10/1986  Japan .

*Primary Examiner*—Milton Nelson, Jr.
*Attorney, Agent, or Firm*—Harness, Dickey & Pierce, P.L.C.

[57] ABSTRACT

A seat recliner mechanism particularly suited for use in the front seats of pickup trucks and two door vehicles, as well as in the rear seats of vans, minivans, sport utility vehicles, station wagons and the like. A single release handle is provided to adjust the reclination angle of the seatback as well as to dump the seatback to a forwardly folded position. The present seat recliner mechanism enables the reclining and forward folding motion to operate about a common axis or independent axes. Additionally, the present seat recliner mechanism is capable of latching the seatback in the forward folded position, thus making the mechanism convenient for use with removable seats. More over, the same release handle may also be used to release the seatback from the forwardly folded position.

33 Claims, 7 Drawing Sheets

SEAT RECLINER MECHANISM

FIELD OF THE INVENTION

The present invention relates to a mechanism incorporated into a seat of a motor vehicle which provides reclining motion between the seat bottom and seatback and, more specifically, to a seat recliner mechanism that is specially adapted for use on a vehicle where only limited reclining motion is available and further where the ability to fold the seatback completely forward to provide access behind the seat is desired.

BACKGROUND AND SUMMARY OF THE INVENTION

Most seat reclining mechanisms are adapted for use on the front seat of a vehicle and are designed to permit adjustment of the reclination angle of the seatback relative to the seat bottom. In two door vehicles having a rear seat, the reclining mechanism for the front seats often includes means for completely folding forward or "dumping" the seatback to permit access to the rear seat. Conventional reclining mechanisms typically employ two release handles, a first handle for adjusting the reclination angle and a second handle for dumping the seatback.

It is therefore desirable to provide an improved seat recliner mechanism having a single handle which can be manipulated to lockably position the seatback into a reclined position as well as to rotate the seatback into its forward dumped position. It is further desirable to provide an improved seat recliner mechanism capable of folding the seatback forward such that, in the forward dumped position, the seatback is substantially parallel to the seat bottom and is locked with respect thereto. Thus, the present invention is particularly well-suited for use in vehicular seating applications where it is desired to provide a limited range of reclining motion as well as the ability to fold the seatback to a forward dumped position. Preferred seating applications include the front seat of pickup trucks and two door vehicles, as well as the rear seats of vans, minivans, sport utility vehicles and station wagons.

In general, the seat reclining mechanism of the present invention comprises inboard and outboard support plates that are secured to the seat and which support the seatback for pivotal motion therebetween to enable reclining motion. The seat recliner mechanism further comprises a toothed quadrant and a toothed pawl pivotally coupled to the support plates for engaging the quadrant. A cam member operably couples a release handle to the pawl such that the release handle is selectively positionable for actuating the engagement of the pawl with the quadrant. Lifting of the release handle from a set position to a release position causes the pawl to disengage from the quadrant, thereby permitting limited reclining of the seatback relative to the seat bottom. Additionally, lifting of the release handle to a dump position serves to displace a stop member disposed on the release handle which limits the forward motion of the seatback, thus enabling the seatback to be dumped forward. Means are also provided for locking the seatback in the forward dumped position. Moreover, the seat recliner mechanism of the present invention enables the seatback to recline and dump about a common axis or alternatively to recline and dump about independent axes.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting of its scope, the invention will be described and explained with additional specificity and detail through the: use of the accompanying drawings in which.

DETAILED DESCRIPTION OF THE PREFERRED EMBODIMENTS

Figure 1:
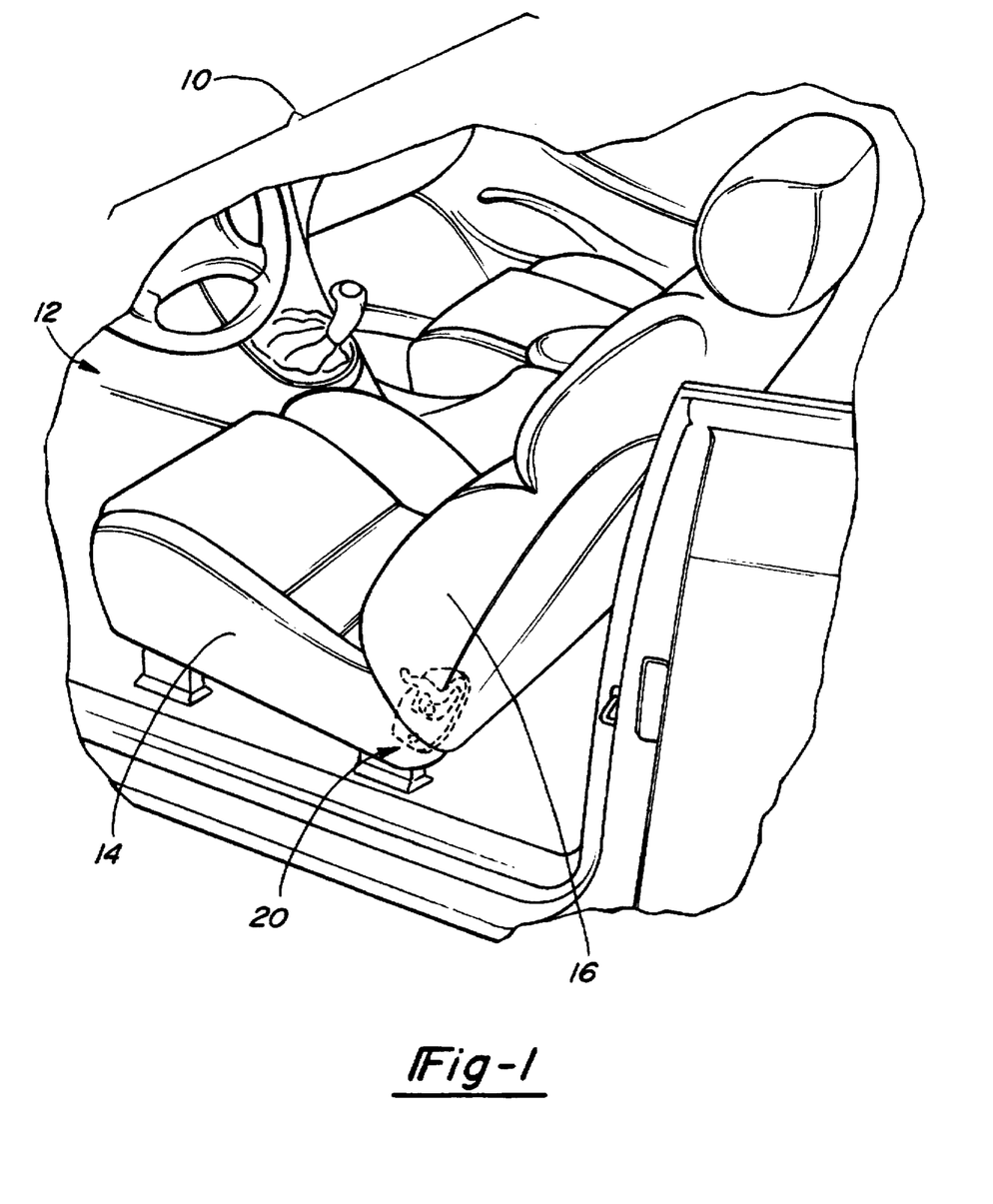
FIG. 1 is a partial perspective view of the interior of a two door vehicle showing the seat recliner mechanism of the present invention located along the outer edge of the front driver-side seat.

Referring to FIG. 1, the present invention relates to a seat recliner mechanism 20 shown incorporated into a seat 12 having a seat bottom 14 and a seatback 16 and which is installed within a motor vehicle 10. The seat recliner mechanism 20 of the present invention couples seatback 16 with seat bottom 14 such that seatback 16 can be rotated about a lateral axis for permitting the occupant of seat 12 to move seatback 16 between an upright position and a fully reclined position relative to seat bottom 14. Seat recliner mechanism 20 further couples seatback 16 to seat bottom 14 such that seatback 16 can be folded forward (i.e., "dumped") about the lateral axis, thereby providing access behind seat 12. In the particular embodiment shown, seat 12 is a bucket-type driver-side seat and seat recliner mechanism 20 is located in proximity to its rearward outboard edge. As will be understood, the particular structure and configuration of seat assembly 12 is merely intended to illustrate an exemplary vehicular seating arrangement to which seat recliner mechanism 20 of the present invention is applicable.

A first embodiment of recliner mechanism 20 according to the present invention is shown in FIGS. 2–6 and is generally designated by the reference numeral 20. The embodiment of seat recliner mechanism 20 illustrated herein by the accompanying Figures is intended for use on the passenger side of vehicle 10, and thus positioned on the outboard side of seat 10. A mirror-image of seat recliner mechanism 20 and its components hereafter described may be employed on the driver side of vehicle 10. It is also contemplated that seat recliner mechanism 20 would be particularly useful on split bench-type seats, including those used as the front seat in pick-up trucks and those used as rear seats in motor vehicles such as, for example, vans, minivans, sport utility vehicles and station wagons.

Figure 2:
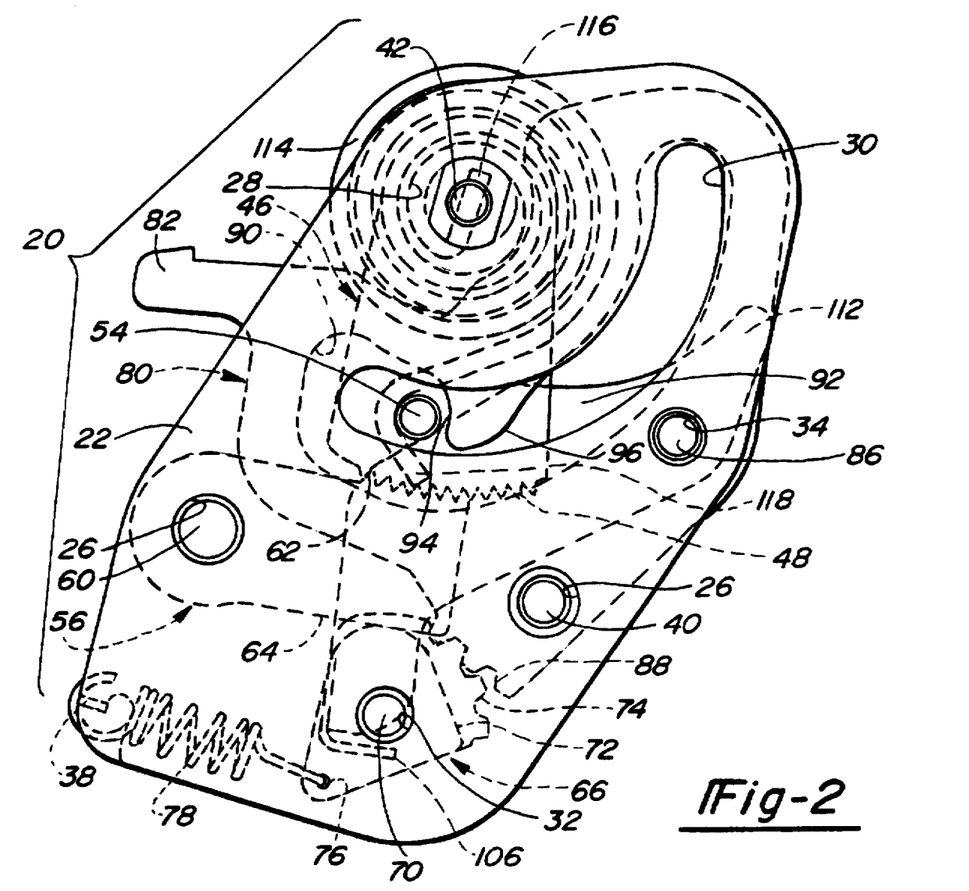
FIG. 2 is a side elevational view of the seat recliner mechanism according to a first embodiment of the present invention.
Figure 3:
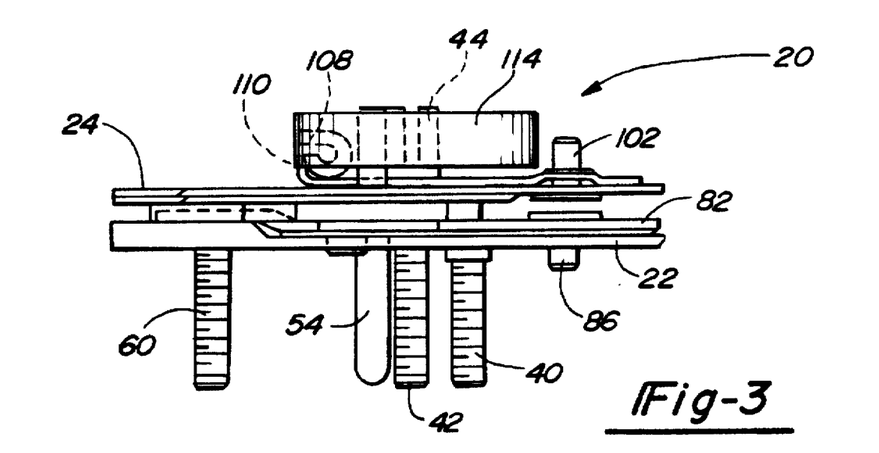
FIG. 3 is a plan view of the seat recliner mechanism shown in FIG. 2.
Figure 4:
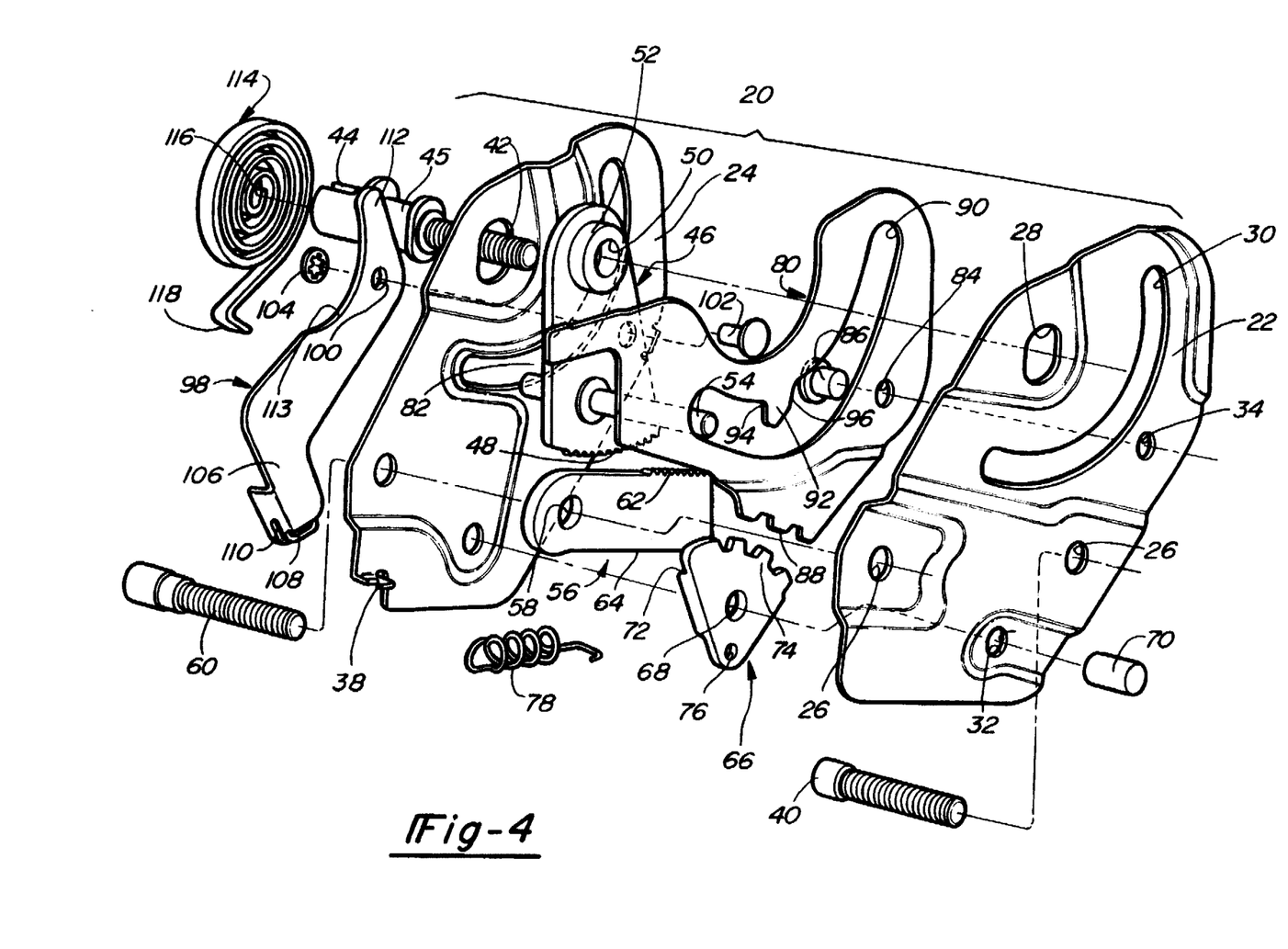
FIG. 4 is an exploded pictorial view of the components associated with the seat recliner mechanism shown in FIG. 2.

With reference to FIGS. 2–4, seat recliner mechanism 20 includes an inboard support plate 22 adapted for location adjacent to seat 12 (not shown) and an outboard support plate 24 adapted to be secured to seat bottom 14 (not shown) for supporting the remaining components of seat recliner mechanism 20. A quadrant member 46 is adapted to be attached to seatback 16 (not shown) such that quadrant member 46 rotates about lateral axis in coordination with the seatback 16. A pawl member 56, a sector cam member 66 and a release member 80 are supported on inboard and outboard support plates 22 and 24, respectively, for pivotal movement thereon. Pawl member 56 is positionable to selectively engage quadrant member 46 to secure seatback 16 in one of a range of incremental reclined positions. Release member 80 is operably interconnected with pawl member 56 via cam member 66 for selectively engaging and disengaging pawl member 56 with quadrant member 46 in response to a seat occupant's manipulation of release member 80.

Inboard and outboard support plates 22, 24 include seat bottom mounting holes 26 adapted to receive seat bottom mounting bolts 40, 60 therethrough which secure inboard and outboard plates 22, 24 to seat bottom 14. Seatback 16 is pivotally coupled to seat bottom 14 via a seatback pivot pin 42 which extends through and is supported by a suitable journal bearing 45 in a pair of elongated holes 28 formed in inboard and outboard support plates 22, 24. Quadrant member 46 includes a bushing 50 having an aperture 52 therethrough for securing quadrant member 46 to pivot pin 42 such that it rotates in coordination with rotation of seatback 16. Quadrant member 46 further includes an arcuate surface opposite from quadrant bushing 50 having quadrant teeth 48 formed thereon. A quadrant guide pin 54 extends through quadrant member 46 between quadrant bushing 50 and quadrant teeth 48 and extends laterally in both the inboard and outboard directions. Inboard and outboard support plates 22, 24 further include a quadrant pin guide slot 30 to allow quadrant guide pin 54 to rotate in an arcuate path in coordination with the rotational motion of the seatback 16.

Pawl member 56 is pivotally interconnected to inboard and outboard support plates 22, 24 for selectively engaging and disengaging quadrant member 46 to permit rotational motion of the seatback 16. Pawl member 56 includes an aperture 58 for receiving a pawl pivot pin 60 therethrough, such that pawl member 56 rotates about the longitudinal axis defined by pawl pivot pin 60. Pawl member 56 further includes pawl teeth 62 formed on an upper surface thereof for engaging quadrant teeth 48 to prevent rotational movement of quadrant member 46, and hence seatback 16, when a desired reclined position is achieved. Pawl member 56 is positionable between a first position wherein pawl teeth 62 engage quadrant teeth 48 and a second position wherein pawl teeth 62 disengages quadrant teeth 48. Pawl member 56 further includes a lower follower surface 64 which cooperates with sector cam member 66 for urging pawl teeth 62 into meshed engagement with quadrant teeth 48.

Figure 5:
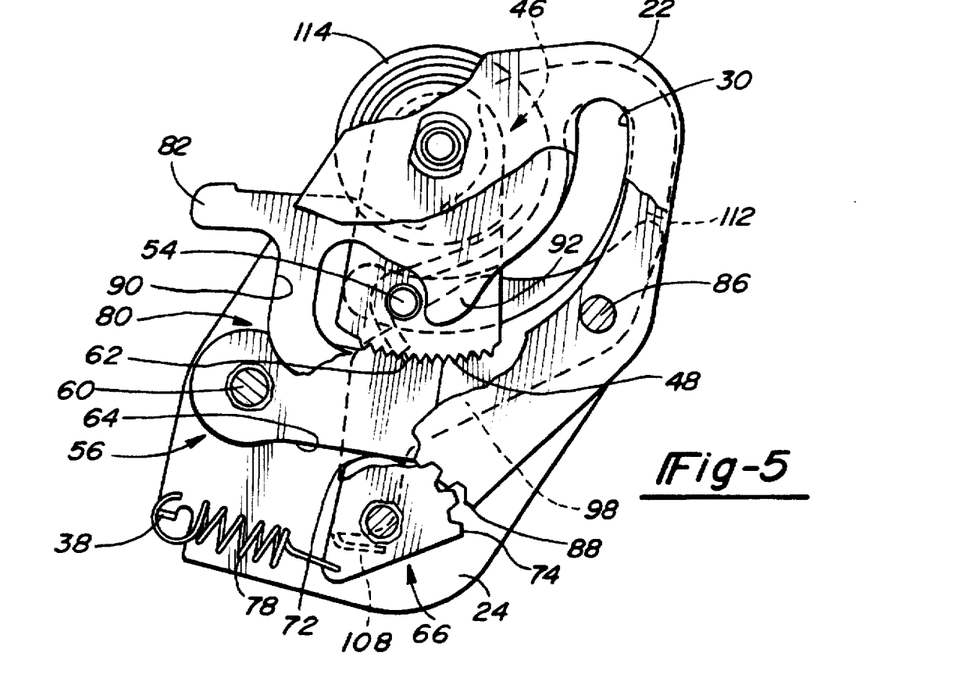
FIG. 5 is a partial side elevational view of the seat recliner mechanism shown in FIGS. 1–4, particularly illustrating operation of the present invention for moving the seatback to a reclined position.
Figure 6:
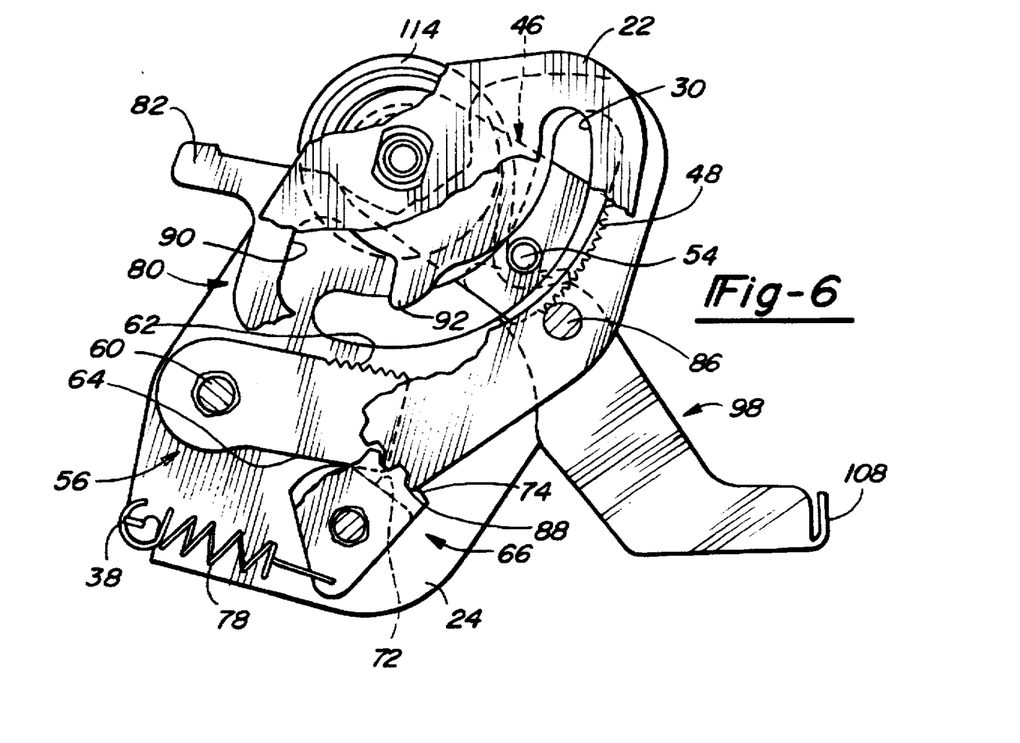
FIG. 6 is a partial side elevational view of the seat recliner mechanism shown in FIGS. 1–4, particularly illustrating the seat recliner mechanism with the seatback in a forward dumped position.

Sector cam member 66 is pivotally coupled to inboard and outboard support plate member 22, 24 by a sector cam pivot pin 70 which passes through apertures 32 formed in inboard and outboard support plates 22, 24 and a sector cam member aperture 68. Sector cam member 66 further includes a camming surface 72 which engages pawl follower surface 64 for selectively positioning pawl member 56 between its first and second position. The profile of cam surface 72 is such that when sector cam member 66 is rotated in a clockwise direction (as shown in FIG. 5), camming surface 72 urges pawl member 56 into engagement with quadrant member 46. When sector cam member 66 is rotated in a counterclockwise direction (as shown in FIG. 6), camming surface 72 allows pawl member 56 to disengage quadrant member 46. A sector cam spring 78 is attached at one end to a spring bracket 38 on outboard plate 24 and is attached at its opposite end to sector cam member 66 via aperture 76. Sector cam spring 78 normally biases sector cam member 66 in the clockwise direction (as shown in FIG. 5) such that camming surface 72 forcibly urges pawl member 56 against quadrant member 46. Sector cam member 66 further includes sector teeth 74 formed thereon for cooperating with release member 80 to allow the seat occupant to selectively rotate sector cam member 66 which engage and disengage pawl member 56 as heretofore described for providing adjustment of the reclined angulation of seatback 16 relative to seat bottom 14.

Release member 80 is pivotally coupled to inboard support plate 22 via a release member pivot pin 86 which extends through an aperture 84 in release member 80 and on aperture 34 in inboard support plate 22 to define the rotational axis of release member 80. Manipulation of release member 80 allows the seat occupant to selectively engage and disengage pawl member 56, thereby adjusting the reclined angle between seat bottom 14 and seatback 16. Handle 82 extends forwardly and outwardly from seat reclining mechanism 20 for allowing the seat occupant to manually manipulate release member 80. Gear teeth 88 are formed on a lower surface of release member 80 and engage sector teeth 74 such that pivotal motion of release member 80 causes gear teeth 88 to drive sector cam member 66 about its rotational axis, thereby disengaging pawl member 56 to permit reclining motion of seatback 16. A slot 90 is formed in release member 80 to provide clearance for quadrant guide pin 54 as it rotates when seatback 16 is adjusted.

A stop member 92 extends from release member 80 parallel to inboard and outboard support plates 22, 24 and includes a leading stop surface 94 and a trailing stop surface 96 which are capable of engaging quadrant guide pin 54 to limit the rotational motion of seatback 16. In this manner, the range of reclining motion is defined by the front portion of slots 30 and 90 and leading stop surface 94. The total range of motion for seatback 16 is limited by slots 30 and 90. In the presently preferred embodiment, the range of reclining movement for seatback 16 is limited to approximately twenty (20) degrees.

Seat recliner mechanism 20 may additionally include a seat release lever 98. Seat release lever 98 is adapted to be coupled to other seat adjustment means (not shown) associated with seat 12 which enables seat 12 to be positioned forward and rearward in the vehicle 10. While not critical to this invention, such a seat adjustment means typically includes a slider mechanism for permitting longitudinal (i.e., fore and aft) adjustment of seat 12 and a locking mechanism for inhibiting movement of seat 12 following such longitudinal adjustment. Seat release lever 98 is pivotally coupled to outboard support bracket 24 via an entry lever pin 102 which extends through an aperture 100 in lever 98 and aperture 34 in outboard support plate 24. A lower portion 106 of lever 98 extends downward and rearward from seatback 16 and includes a lower flange portion 108. A slot 110 is formed in lower flange portion 108 and adapted to securely retain a release cable coupled to the locking mechanism of the seat adjustment means for selectively sliding seat 12 forward and rearward in the vehicle. An upper portion 112 of release lever 98 extends upward towards seatback 16 such that a front edge 113 thereof is capable of engaging quadrant guide pin 54 when seatback 16 is rotated into its forward dumped position. Thus, seat release lever 98 facilitates access behind the seat by forwardly positioning seat 12 in the vehicle when seatback 16 is placed in its forwardly-folded dumped position.

Seat recliner mechanism 20 further includes a torsional return spring 114 coupled between seatback pivot pin 42 and quadrant guide pin 54 to bias seatback 16 for movement in a counterclockwise direction (as shown in FIG. 4) toward an upright position. Seatback pivot pin 42 has slot 44 formed in an end opposite quadrant member 46 for receiving an inner radial end 116 of torsional return spring 114. An outer radial end 118 of torsional return spring 114 is adapted to engage a portion of quadrant guide pin 54 which extends outboard of outboard support plate 24, thereby biasing quadrant member 46 and seatback 16.

With reference to FIGS. 5 and 6, the operation of seat recliner mechanism 20 will now be described. In operation, release mechanism 80 is positionable in three positions, namely a "looked" position, a "released" position, and a "dumped" position for actuating seat recliner mechanism 20. When in the "locked" position, gear teeth 88 of release mechanism 80 cooperate with sector teeth 74 and sector cam spring 78 to position sector cam member 66 in a first clockwise position. In this first position, camming surface 72 engages pawl follower surface 64 to urge pawl member 56 into an engaged position, whereby pawl teeth 62 lockingly engage quadrant teeth 48 to prevent rotational movement of seatback 16 relative to seat bottom 14.

To adjust the reclination angle of seatback 16, a seat occupant manipulates release mechanism 80 into the "released" position by exerting an upward force on release handle 82 causing release mechanism 80 to rotate in a clockwise direction about the axis defined by release pivot pin 86 (as shown in FIG. 5). As release mechanism 80 rotates, gear teeth 88 drive sector teeth 74 causing sector cam member 66 to rotate in a counterclockwise position. During rotation, camming surface 72 disengages pawl follower surface 64, whereby pawl teeth 62 are disengaged from quadrant teeth 48 for allowing reclining motion of seatback 16. The seat occupant can reposition seatback 16 by exerting a rearward force on seatback 16 to overcome the biasing force generated by torsional return spring 114. Once comfortably repositioned, release mechanism 80 is returned to its "locked" position causing sector cam member 66 to rotate clockwise such that camming surface 72 again urges pawl member 56 to engage quadrant member 46, thereby preventing further rotational motion of seatback 16.

When it is desired to place seatback 16 in a forward dumped position, release mechanism 80 is manipulated into its "dumped" position by exerting an upward force on release handle 82 causing release mechanism 80 to rotate in a clockwise direction about the axis defined by release pivot pin 86. As can be appreciated from the drawings, release lever 82 must be manipulated past the "released" position to achieve the forward dump position. As a result, sector cam 66 causes pawl member 56 to disengage quadrant member 46 as heretofore described. Moreover, such additional rotation of release mechanism 80 causes stop member 92 to rotate out of the blocking path of quadrant guide pin 54. Thus, quadrant guide pin 54 is thereafter free to move within the full length of guide slot 30 and is not limited to the range of rotational movement defined by abutment with leading stop surface 94 on stop member 92.

As quadrant guide pin 54 rotates about pivot pin 44, it engages front edge 113 of seat release lever 98 causing seat release lever 98 to rotate about pin 102. This rotation of lower portion 106 tensions a cable (not shown) which activates the seat adjustment means (not shown) for allowing seat 12 to slide to its forwardmost longitudinal position in vehicle 10 when seat 12 is in its forward dumped position.

Importantly, it will be noted that leading stop surface 94 of stop member 92 is configured with a slightly concave shape defined by a radius of curvature that is greater than the radius of quadrant guide 54. In this manner, in the event of a failure of quadrant teeth 48 or pawl teeth 62, as might occur in a severe impact situation, quadrant guide pin 54 will engage and be captured by leading stop surface 94 on stop member 92, thus preventing forward excursion of seatback 16. However, leading stop surface 94 is not too deeply concave in configuration so as to preclude the upward pivoting of release member 80 when the angular position of seatback 16 is such that quadrant guide pin 54 is engaged with leading stop surface 94.

When seatback 16 is raised from its forward dumped position, the corresponding rotation of quadrant member 46 brings quadrant guide pin 56 into contact with trailing stop surface 96 on stop member 92. As quadrant member 46 continues to rotate clockwise, quadrant guide pin 56 urges stop member 90 upwardly, thereby pivoting release member 80 and sector cam 66 against the bias of sector cam spring 74. The resulting clockwise rotation of sector cam 66 causes pawl member 56 to rotate in a clockwise direction to its disengaged position as heretofore described. Once quadrant guide pin 56 rotates past stop member 92, sector cam spring 78 causes sector cam member 66 to pivot clockwise to simultaneously lower release mechanism 80 and place pawl member 56 in its engaged position, thus preventing reclining motion of seatback 16 as previously described.

Figure 7:
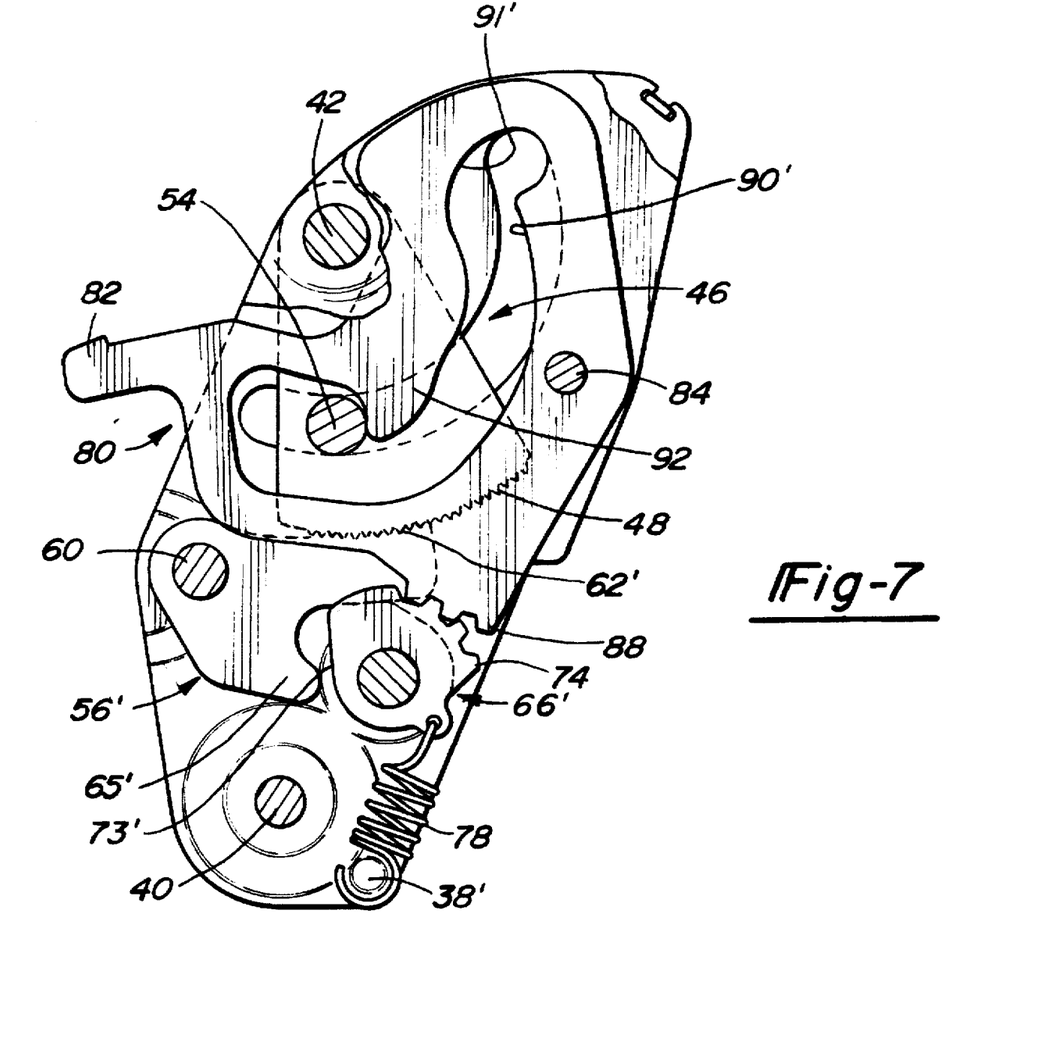
FIG. 7 is a side elevation view of the seat recliner mechanism according to a second embodiment of the present invention.
Figure 8:
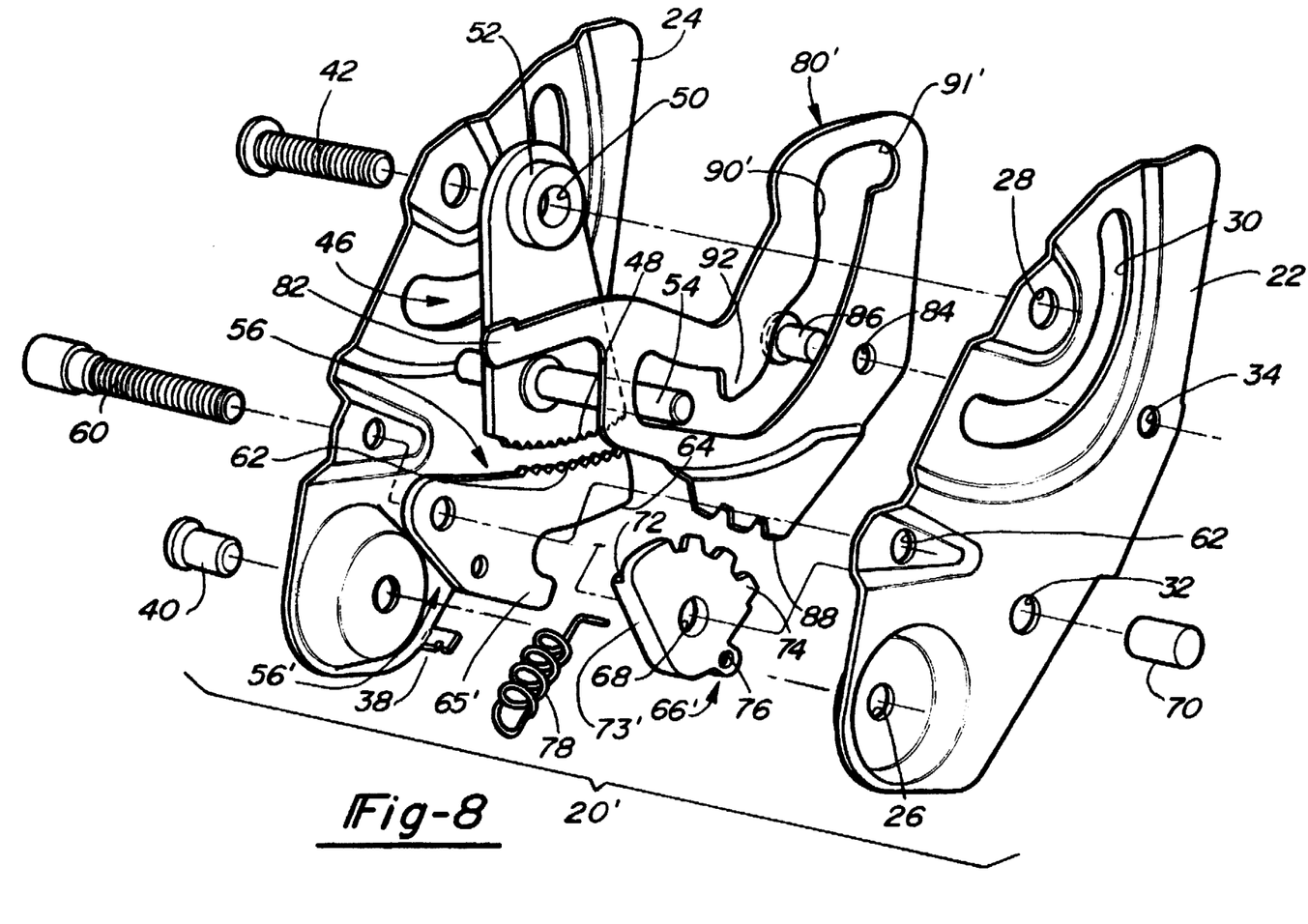
FIG. 8 is an exploded pictorial view of the components of the seat recliner mechanism shown in FIG. 7.

Turning now to FIGS. 7 and 8, an alternative embodiment of the present invention is shown and generally designated by reference numeral 20'. Components in this alternate embodiment corresponding to components in the first embodiment are designated by identical reference numerals. Those components which are modified in the alternate embodiment are designed with a prime reference numeral similar to that referred to in the first described embodiment. For example, sector cam member 66' of the alternative embodiment corresponds to sector cam member 66 of the first embodiment with the exception of the modifications noted hereafter. Thus, the seat recliner mechanism shown in FIGS. 7 and 8 operates in essentially the same manner as the embodiment described with respect to FIGS. 2–6, with the following exceptions. Pawl member 56' is formed with secondary follower segments 65' which is adapted to engage leading edge 73' of sector cam member 66' as sector cam member 66' is rotated in a counter-clockwise direction (as shown in FIG. 8). As sector cam member 66' rotates, camming surface 72 disengages pawl follower surface 64 as heretofore described. Further counter-clockwise rotation of sector cam member 66' causes leading edge 73' of sector cam member 66' to engage secondary follower segments 65', thereby providing positive mechanical disengagement of pawl member 56' from quadrant member 46. Thus, in a situation where the load applied to seatback 16 causes quadrant teeth 48 to become temporarily locked with pawl teeth 62, the positive mechanical engagement of leading edge 73' with secondary pawl follower 65' will forcibly disengage pawl member 56' from quadrant member 46.

As illustrated in FIGS. 7 and 8, arcuate slot 90' formed in release member 80' includes a substantial bend 91' approaching 90° at its end opposite to release handle 82. Accordingly, as quadrant member 46 rotates counter-clockwise when seatback 16 is adjusted to its forward folded position, quadrant guide pin 54 forces release member 80' to rotate about release pivot pin 84 in a manner corresponding to the contours of slot 90'. When quadrant guide pin 54 reaches bend 91' in slot 90' at the end of its excursion, the bias of sector cam spring 78, acting through sector teeth 74 and guide teeth 88, lowers release member 80' towards it original position, thereby capturing quadrant guide pin 54 in bend 91'. Consequently, quadrant member 46, and hence seatback 16, is locked in the forward folded position. To release seatback 16 from the forward folded position, the user manipulates release handle 82 in a generally upward direction, thereby retracting quadrant guide pin 54 out of bend 91' and back into slot 90'. The quadrant member 46 is now permitted to rotate clockwise (as shown in FIG. 8) to its original position as described in connection with the first embodiment.

The balance of the components illustrated in FIGS. 7 and 8 of the alternate embodiment are substantially similar to those components described with reference to the first embodiment and illustrated in FIGS. 2–5. Accordingly, the components and method of operation are likewise substantially similar to the disclosure provided above.

Figure 9:
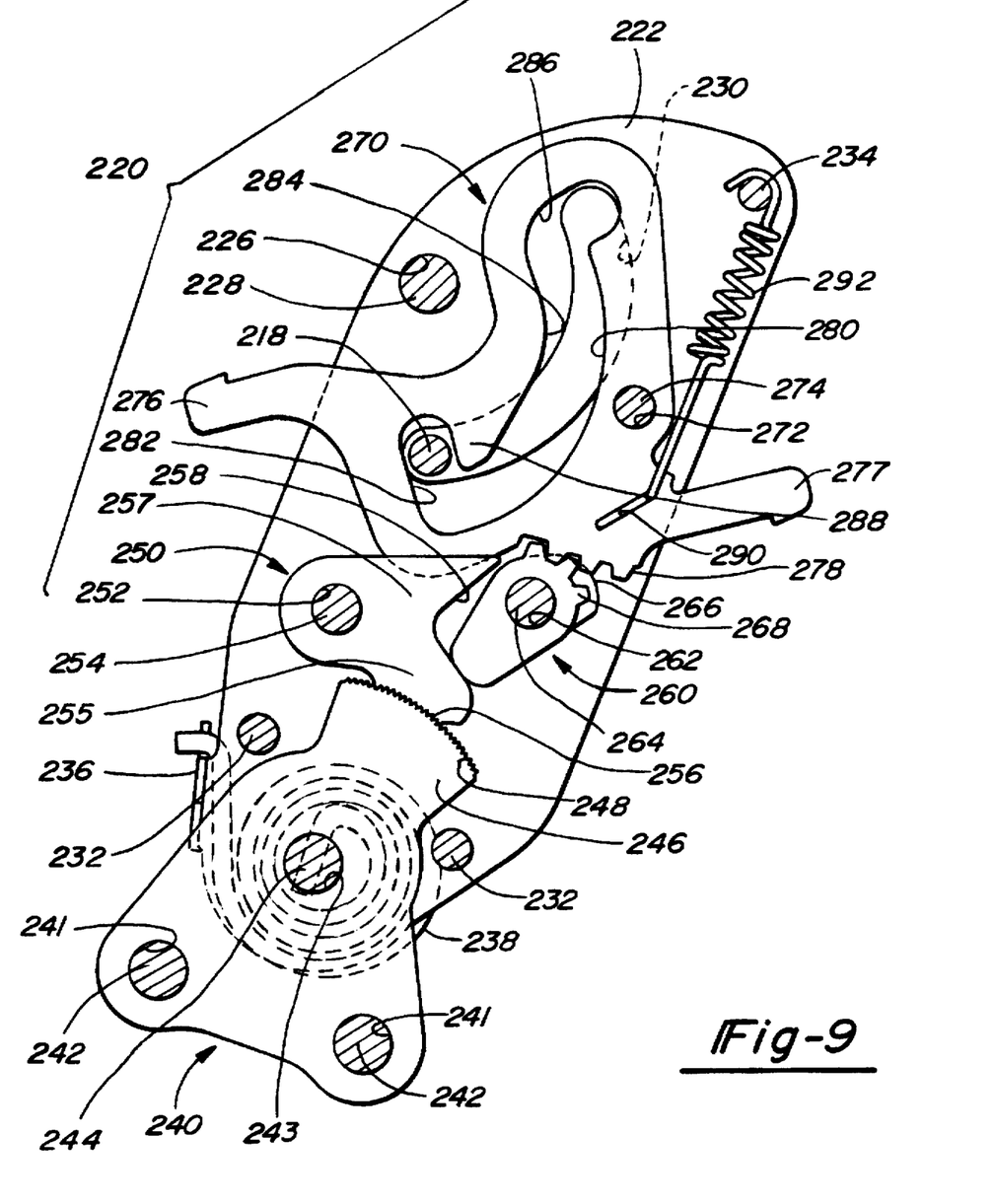
FIG. 9 is a side elevation view of the seat recliner mechanism according to a third embodiment of the present invention.

Referring now to FIG. 9, an alternate embodiment of the present invention is shown and generally designated by seat recliner mechanism 220. Seat recliner mechanism 220 of the present invention is adapted to couple seatback 16 with seat bottom 14 such that seatback 16 can be rotated about a first lateral axis defined by the central longitudinal axis of recliner pivot pin 244 to place the occupant of vehicle seat 10 in a plurality of reclined positions. Seat recliner mechanism 220 further couples seatback 16 to seat bottom 14 such that seatback 16 can be folded or dumped forward about a second longitudinal axis defined by the central longitudinal axis of forward folding pivot pin 228. The location of first lateral axis is such that seatback 16 is able to recline relative to seat bottom 14 about an axis which is most comfortable to the seat occupant. Furthermore, the location of second lateral axis is such that seatback 16 is able to fold forward about an axis which allows seatback 16 to achieve a substantially parallel position relative to seat bottom 14.

With further reference to FIG. 9, seat recliner mechanism 220 includes inboard support plate 222 and outboard support plate (not shown) adapted to be secured to seatback 16 for supporting the remaining components of seat recliner mechanism 220. Quadrant member 240 is secured to seat bottom 14 and operably couples inboard support plate 222 and the outboard support plate thereto such that seatback 16 and the support plates rotate about the first lateral axis of seat recliner mechanism 220. Pawl member 250 is pivotally supported on the inboard and outboard support plates and operably engage quadrant member 240 to retain seatback 16 in one of a plurality of reclined positions. Release member 270 and cam member 260 are also pivotally supported on the inboard and outboard support plates for urging pawl member 250 into engagement with quadrant member 240, in response to a seat occupant's manipulation thereof.

A pair of apertures 241 formed in the lower portion of quadrant member 240 are adapted to receive attachment bolts 242 for securing quadrant member 240 to seat bottom 14. Quadrant member 240 further includes aperture 243 adapted to receive reclining pivot pin 244 therein. Similarly, the inboard and outboard support plates each include an aperture 245 for receiving reclining pivot pin 244, thereby coupling inboard support plate 222 and the outboard support plate and seatback 16 for pivotal motion about reclining pivot pin 244. Seat recliner mechanism 220 further includes spring means for biasing seatback 16 towards and upright vertical position relative to seat bottom 14. Spring means includes torsional spring 238 operably disposed between reclining pivot pin 244 and torsional spring tab 236 formed on the lower portion of inboard support plate 222. Quadrant member 240 further includes arcuate portion 246 having a plurality of teeth 248 formed on an upper surface thereof. Seatback recliner mechanism 220 of the present invention further includes a pair of quadrant limit pins disposed between the inboard and outboard support plate for engaging quadrant member 240 to limit the forward and rearward reclining limits of seat recliner 220.

Pawl member 250 is pivotally supported on the inboard and outboard support plates for selectively engaging and disengaging quadrant member 240 to permit reclining motion of seatback 16. Pawl member 250 includes aperture 252 for receiving pawl pivot pin 254 therethrough, such that pawl member 250 rotates about the longitudinal axis defined by pawl pivot pin 254. A lower portion 255 of pawl member 250 has a plurality of teeth 256 formed thereon for engaging quadrant teeth 246 to prevent rotational movement of seatback 16 when a desired reclined position is achieved. Pawl member 250 further includes an upper portion 257 having a follower surface 258 formed thereon which cooperates with sector cam 260 for urging pawl teeth 256 into engagement with quadrant teeth 246.

Sector cam 260 includes aperture 262 for receiving cam pivot pin 264 and pivotally supporting sector cam 260 on the inboard and outboard support plates. Sector cam 260 further includes camming surface 266 for engaging pawl follower surface 258 to selectively position pawl member 250. The profile of camming surface 266 is such that when sector cam 260 is rotated in a counter clockwise direction (as shown in FIG. 9), camming surface 266 engages follower surface 258 to rotate pawl member 250 in a counter clockwise direction (as shown in FIG. 9), thus disengaging pawl member 250 from quadrant member 240 and allowing the seatback to pivot about reclining pivot pin 244. Sector cam 260 further includes sector teeth 268 formed therein to operably couple sector cam 260 with release member 270 for allowing the seat occupant to adjust the reclined position of seatback 16.

Release member 270 is pivotally supported on the inboard and outboard support plates by release member pivot pin 274 which extends through aperture 272. Handle 276 extends forward and out from seat recliner mechanism 220 while handle 277 extends rearward and out from seat recliner mechanism 224 allowing an occupant seated in or behind the seat assembly to manual manipulate release member 270. Gear teeth 278 are disposed on a lower surface of release member 270 and engage sector teeth 268, such that pivotal motion of release member 270 in a clockwise direction (as shown in FIG. 9) causes gear teeth 278 to drive sector cam 260 about its rotational axis thereby disengaging pawl member 250 from quadrant member 240 to permit reclining motion of seatback 16. Release member 270 further includes a lost motion slot 290 formed therein and adapted to receive one end of biasing spring 292. The opposite end of biasing spring 292 is retained on a biasing spring pin 234 disposed between the inboard and outboard support plates. Biasing spring 292 biases release member 270 in a counter clockwise direction (as shown in FIG. 9) for maintaining seat recliner mechanism 220 in the set position.

Release member 270 is further adapted to fold seatback 16 in a forwardly dumped position. Seatback 16 is pivotally supported on the inboard and outboard support plate by forward folding pivot pin 228 which extends through aperture 226. Seatback 16 is further coupled to seat recliner mechanism 220 by seatback guide pin 218, which extends outboard from seatback 16 and through guide pin slots 230 formed in the inboard and outboard support plates. A corresponding guide slot 280 is formed in release member 270 and cooperates with seatback guide pin 218 for selectively adjusting seatback 16 between its upright reclinable position and its forwardly folded, dumped position. Guide slot 280 includes a first portion 282 for enabling seat recliner mechanism 220 to adjustably position the reclined angle of seatback 16 relative to seat bottom 14, an intermediate portion 282 for guiding seatback 16 through the forward folding motion about the axis defined by forward folding pivot pin 228, and a locking portion 286 for securing seatback 16 in its forward folded, dumped position. First portion 282 includes the forward most portion of guide slot 280 and is further defined by stop member 288 extending downward parallel to inboard and outboard support plate 222, 224. Thus, stop member 288 extends downward to prevent seatback guide pin 218 from rotating relative to seatback pivot pin 228 when release member 270 is manipulated between the set and release positions to selectively recline seatback 16 relative to seat bottom 14.

Once release member 270 is further rotated in a clockwise direction (as shown in FIG. 9) seatback guide pin 218 is no longer constrained by stop member 288 such that it is allowed to rotate relative to forward folding pivot pin 228 into the intermediate portion 284 of release member 270 and along the arcuate path defined by guide pin slot 230 formed in the support plates. As seatback guide pin 218 rotates in a counterclockwise direction about forward folding pivot pin 228, seatback 16 achieves a forward folded position which is substantially parallel to seat bottom 14. In this substantially parallel position, locking portion 286 of guide slot 280 lockingly engages guide pin 218 such that seatback 16 is secured in the forward folded, dumped position. To return seatback 16 to an upright reclinable position, release member 270 is rotated in a clockwise direction to disengage seatback guide pin 218 from locking portion 286 of guide slot 280. Seatback 16 is then raised to an upright position causing seatback guide pin 218 to rotate about forward folding pivot pin 228 in a clockwise direction. Once in an upright position, seatback guide pin 218 engages stop member 288, thereby preventing further rotational movement of seatback 16 about forward folding pivot pin 228. Seatback 16 is once again adjustably reclinable about reclining pivot pin 244.

It will be appreciated that the seat recliner mechanisms of the present invention utilizes a single release handle to control both the reclining motion of seatback and the forward folding or dumping of seatback. The reclining motion and forward folding motion may operate about a common axis or an independent axis for each motion. Further, the present invention provides a means for latching seatback in its forward folded or dumped position and utilizing the single release handle to release the forward folded seat from its latched condition. Moreover, by latching seatback in the forward folded position, the seat recliner mechanism of the present invention is particularly adapted for use with removable seats such as the middle or rear seats in a van or minivan.

While the above description constitutes the preferred embodiments of the invention, it will be appreciated that the invention is susceptible to modification, variation and change without departing from the proper scope or fair meaning of the accompanying claims.

What is claimed is:

1. A seat recliner mechanism for use on a vehicle seat having a seat bottom and a seatback, the seat recliner mechanism comprising:

pivot means for interconnecting the seatback to the seat bottom for pivotable movement of the seatback through a range of reclined positions and to a forwardly folded position relative to the seat bottom;

engagement means movable between a first position for engaging said pivot means to prohibit pivotal positioning of the seatback relative to the seat bottom and a second position for disengaging said pivot means to permit pivotal positioning of the seatback relative to the seat bottom;

cam means operably coupled to said engagement means for engaging said engagement means with said pivot means, said cam means including a plurality of sector teeth; and actuation means having gear teeth for meshed engagement with said sector teeth of said cam means, said actuation means being selectively positionable between a set position for urging said engagement means into said first position such that the seatback is in a fixed reclined position relative to the seat bottom and a release position for urging said engagement means into said second position such that the seatback is pivotally positionable relative to the seat bottom, said actuation means further positionable in a dumped position for enabling the seatback to be pivoted to said forwardly folded position.

2. The seat recliner mechanism of claim 1 wherein said cam means is operably coupled to said engagement means for disengaging said engagement means from said pivot means.

3. The seat recliner mechanism of claim 1 wherein said actuation means locks the seatback into said forwardly folded position when said actuation means is positioned in said dumped position.

4. The seat recliner mechanism of claim 1 wherein the seatback rotates about a first axis for pivotally moving the seatback through said range of reclined positions and said seatback rotates about a second axis for pivotally moving the seatback to said forwardly folded position.

5. The seat recliner mechanism of claim 1 further comprising stop means cooperating with said pivot means for limiting said range of reclined positions of the seatback relative to the seat bottom.

6. The seat recliner mechanism of claim 1 further comprising a support plate adapted to be interdisposed between the seatback and seat bottom, said engagement means, said cam means and said actuation means being pivotally supported from said support plate.

7. The seat recliner mechanism of claim 1 wherein said actuation means is operably coupled to said cam means to provide relative movement therebetween.

8. A seat comprising:

a seatback;

a seat bottom;

pivot means interconnecting said seatback to said seat bottom for pivotable movement of said seatback through a range of reclined positions and to a forwardly folded position relative to said seat bottom;

engagement means movable between a first position for engaging said pivot means to inhibit pivotal movement of said seatback relative to said seat bottom and a second position for disengaging said pivot means to permit pivotal movement of said seatback relative to said seat bottom;

cam means pivotally supported by a first pivot and operably coupled to said engagement means for engaging said engagement means with said pivot means, said cam means including a plurality of sector teeth; and actuation means pivotally supported by a second pivot and having gear teeth for meshed engagement with said sector teeth of said cam means, whereby rotation of said actuation means about said second pivot causes an opposite rotation of said cam means about said first pivot, said actuation means being selectively positionable between a locked position for urging said engagement means into said first position such that said seatback is in a fixed reclined position relative to said seat bottom and a released position for urging said engagement means into said second position such that said seatback is pivotally movable relative to said seat bottom, said actuation means further positionable in a dumped position for enabling said seatback to be pivoted to said forwardly folded position.

9. The seat of claim 8 wherein said cam means is operably coupled to said engagement means for disengaging said engagement means from said pivot means.

10. The seat recliner mechanism of claim 8 wherein said actuation means is operably coupled to said cam means to provide relative movement therebetween.

11. A seat recliner mechanism for use on a vehicle seat having a seat bottom and a seatback, the seat recliner mechanism comprising:

a recliner support bracket adapted to be secured to the seat bottom;

a quadrant member adapted to be secured to the seatback and journally supported by said recliner support bracket such that the seatback is pivotally movable through a range of reclined positions and in a forwardly folded position relative to the seat bottom;

a pawl member supported on said recliner support bracket for pivotal movement and operatively coupled to said quadrant member, said pawl member being positionable between a first position for engaging said quadrant member to inhibit pivotal movement of the seatback and a second position for disengaging said quadrant member to permit pivotal movement of the seatback;

a cam member supported on said recliner support bracket for pivotal movement and operably coupled to said pawl member such that rotational movement of said cam member urges said pawl member into engagement with said quadrant member; and a release lever supported on said recliner support bracket for pivotal movement and operatively coupled to said cam member to provide relative rotation therebetween, said release lever positionable between a locked position whereat said cam member engages said pawl member with said quadrant member and a released position whereat said cam member disengages said pawl member from said quadrant member, said release lever further positionable in a dumped position for enabling the seatback to be moved to said forwardly folded position.

12. The seat recliner mechanism of claim 11 wherein said cam member further comprises a drive portion engaging said release lever and a cam portion engaging a first follower portion formed on said pawl member.

13. The seat recliner mechanism of claim 11 wherein said pawl member further comprises a second follower portion for engaging said cam member to positively disengage said pawl member from said quadrant member.

14. The seat recliner mechanism of claim 11 wherein said cam member further comprises spring means for biasing said cam member such that said cam member urges said pawl member towards said first position.

15. The seat recliner mechanism of claim 11 wherein said quadrant member further comprises a toothed quadrant and said pawl member further comprises a toothed pawl, and wherein said toothed pawl engages said toothed quadrant when said pawl member is maintained in said first position to inhibit pivotal movement of the seatback.

16. The seat recliner mechanism of claim 11 wherein said release lever further comprises a lock means for locking the seatback in said forwardly folded position when said release lever is positioned in said dumped position.

17. The seat recliner mechanism of claim 11 further comprising spring means coupled to said quadrant member for biasing the seatback towards said forwardly folded position.

18. The seat recliner mechanism of claim 11 wherein said quadrant member further comprises a quadrant and a quadrant guide pin extending from said quadrant, and wherein said release lever has a slot formed therein such that said quadrant guide pin travels in said slot upon pivotal movement of the seatback.

19. The seat recliner mechanism of claim 18 wherein said release lever further comprising a stop member extending into said slot for engaging said quadrant pin to limit said range of reclining positions.

20. A seat comprising:

a seatback;

a seat bottom;

a recliner support bracket secured to said seat bottom;

a quadrant member secured to said seatback and journally supported by said recliner support bracket such that said seatback is pivotally movable through a range of reclined positions and in a forwardly folded position relative to said seat bottom;

a pawl member supported on said recliner support bracket for pivotal movement and operatively coupled to said quadrant member, said pawl member being positionable between a first position for engaging said quadrant member to inhibit pivotal movement of said seatback and a second position for disengaging said quadrant member to permit pivotal movement of said seatback;

a cam member supported on said recliner support bracket for pivotal movement and operably coupled to said pawl member such that rotational movement of said cam member urges said pawl member into engagement with said quadrant member; and a release lever supported on said recliner support bracket for pivotal movement and operatively coupled to said cam member to provide relative rotation therebetween, said release lever positionable between a locked position whereat said cam member engages said pawl member with said quadrant member and a released position whereat said cam member disengages said pawl member from said quadrant member, said release lever further positionable in a dumped position for enabling said seatback to be moved to said forwardly folded position.

21. The seat of claim 20 wherein said cam member further comprises a drive portion engaging said release lever and a cam portion engaging a first follower portion formed on said pawl member.

22. The seat of claim 20 wherein said pawl member further comprises a second follower portion for engaging said cam member to positively disengage said pawl member from said quadrant member.

23. The seat of claim 20 wherein said quadrant member further comprises a toothed quadrant and said pawl member further comprises a toothed pawl, and wherein said toothed pawl engages said toothed quadrant when said pawl member is maintained in said first position to inhibit pivotal movement of the seatback.

24. The seat of claim 20 wherein said release lever further comprises a lock means for locking the seatback in said forwardly folded position when said release lever is positioned in said dumped position.

25. A seat recliner mechanism for use on a vehicle seat having a seat bottom and a seatback, the seat recliner mechanism comprising:

a recliner support bracket for operably interconnecting the seatback and the seat bottom such that the seatback is pivotally movable about a first axis between an upright position and a forwardly folded position relative to said recliner support bracket and the seat bottom;

a quadrant member adapted to be secured to the seat bottom and journally supporting said recliner support bracket such that the seatback and said recliner support bracket are pivotally positionable about a second axis through a range of reclined positions relative to the seat bottom;

a pawl member supported on said recliner support bracket for pivotal movement and operatively coupled to said quadrant member, said pawl member being positionable between a first position for engaging said quadrant member to inhibit pivotal movement of the seatback about said second axis and a second position for disengaging said quadrant member to permit pivotal movement of the seatback about said second axis;

a cam member supported on said recliner support bracket for pivotal movement and operatively coupled to said pawl member such that rotational movement of said cam member urges said pawl member into engagement with said quadrant member; and a release lever journally supported on said recliner support bracket for pivotal movement and operatively coupled to said cam member, said release lever positionable between a locked position for rotating said cam member to engage said pawl member with said quadrant member and a released position for rotating said cam member to disengage said pawl member from said quadrant member, said release lever further positionable in a dumped position for enabling the seatback to be positioned in said forwardly folded position.

26. The seat recliner mechanism of claim 25 wherein said cam member further comprises a drive portion engaging said release lever and a cam portion engaging a follower portion formed on said pawl member.

27. The seat recliner mechanism of claim 25 wherein said quadrant member further comprises a toothed quadrant and said pawl member further comprises a toothed pawl, and wherein said toothed pawl engages said toothed quadrant when said pawl member is maintained in said first position to prohibit pivotal movement of the seatback.

28. The seat recliner mechanism of claim 25 wherein said release lever further comprises spring means for biasing said release lever such that said cam member urges said pawl member towards said first position.

29. The seat recliner mechanism of claim 25 wherein said release lever further comprises a lock means for locking the seatback in said forwardly folded position when said release lever is positioned in said dumped position.

30. The seat recliner mechanism of claim 25 wherein said release lever is operatively coupled to said cam member to provide relative rotation therebetween.

31. The seat recliner mechanism of claim 25 further comprising spring means coupled to said quadrant member for biasing the seatback toward said forwardly folded position.

32. The seat recliner mechanism of claim 25 wherein said quadrant member further comprises a quadrant and a quadrant guide pin extending from said quadrant, said release lever having a slot formed therein such that said quadrant guide pin travels in said slot as the seatback is pivotally moved.

33. The seat recliner mechanism of claim 32 wherein said release lever further comprising a stop member extending into said slot for engaging said quadrant pin to limit said range of reclining positions of the seatback relative to the seat bottom.

* * * * *